United States Patent
Fauron et al.

(10) Patent No.: US 12,555,329 B2
(45) Date of Patent: Feb. 17, 2026

(54) METHOD FOR CREATING A 3D DIGITAL MODEL OF ONE OR MORE AIRCRAFT ELEMENTS IN ORDER TO PRODUCE AUGMENTED REALITY IMAGES

(71) Applicant: SAFRAN LANDING SYSTEMS, Velizy-Villacoublay (FR)

(72) Inventors: Dimitri Alain Fauron, Moissy-Cramayel (FR); Guillaume Jules Pierre Klein, Moissy-Cramayel (FR)

(73) Assignee: SAFRAN LANDING SYSTEMS, Velizy-Villacoublay (FR)

( * ) Notice: Subject to any disclaimer, the term of this patent is extended or adjusted under 35 U.S.C. 154(b) by 337 days.

(21) Appl. No.: 18/261,925

(22) PCT Filed: Jan. 11, 2022

(86) PCT No.: PCT/FR2022/050058
§ 371 (c)(1),
(2) Date: Jul. 18, 2023

(87) PCT Pub. No.: WO2022/157439
PCT Pub. Date: Jul. 28, 2022

(65) Prior Publication Data
US 2024/0078764 A1    Mar. 7, 2024

(30) Foreign Application Priority Data
Jan. 19, 2021 (FR) ......................................... 2100482

(51) Int. Cl.
*G06T 19/00* (2011.01)

(52) U.S. Cl.
CPC .................................. *G06T 19/006* (2013.01)

(58) Field of Classification Search
None
See application file for complete search history.

(56) References Cited

FOREIGN PATENT DOCUMENTS

FR    3080184 A1    10/2019

OTHER PUBLICATIONS

International Search Report for issued in Application No. PCT/FR2022/050058 dated May 6, 2022.
Written Opinion for PCT/FR2022/050058 dated May 6, 2022.
Kahn, Svenja, "Reducing the gap between Augmented Reality and 3D modeling with real-time depth imaging", Virtual Reality, Dec. 23, 2011, pp. 111-123, vol. 17, No. 2, XP055244589.

(Continued)

*Primary Examiner* — Nicholas R Wilson
(74) *Attorney, Agent, or Firm* — McDonald Hopkins LLC (57) ABSTRACT

Method for creating a 3D digital model of at least one aircraft element in order to produce augmented reality image(s), the method including the steps of: a) scanning, at least one element of an aircraft so as to produce a set of digitised points representative of the 3-dimensional shape of the element, then, using a computer and/or at least one computer processing unit; b) forming, from the set of digitised points, at least one 3D mesh representative of the shape of the element; c) modifying a replica of the given mesh so as to add a missing geometric pattern corresponding, in particular, to a pattern of the element located in its inner volume and/or which is located outside the field of view of the scanner during the scanning in step a).

8 Claims, 11 Drawing Sheets

(56) References Cited

OTHER PUBLICATIONS

Kumar, et al., "Sensor Fusion Based Pipeline Inspection for the Augmented Reality System", Symmetry, Oct. 22, 2019, p. 1325, vol. 11, No. 10, XP055849510.

Eschen, Henrik, et al., "Augmented and Virtual Reality for Inspection and Maintenance Processes in the Aviation Industry", Procedia Manufacturing, 43rd North American Manufacturing Research Conference, NAMRC 43, Jun. 8-12, 2015, Nov. 7, 2017, pp. 156-163, vol. 19, UNC Charlotte, North Carolina, United States, XP055849362.

METHOD FOR CREATING A 3D DIGITAL MODEL OF ONE OR MORE AIRCRAFT ELEMENTS IN ORDER TO PRODUCE AUGMENTED REALITY IMAGES

This is the National Stage of PCT international application PCT/FR2022/050058, filed on Jan. 11, 2022 entitled "METHOD FOR CREATING A 3D DIGITAL MODEL OF ONE OR MORE AIRCRAFT ELEMENTS IN ORDER TO PRODUCE AUGMENTED REALITY IMAGES", which claims the priority of French Patent Application No. 2100482 filed Jan. 19, 2021.

TECHNICAL FIELD AND PRIOR ART

The present invention relates to the field of data acquisition and processing for implementing an augmented reality digital system dedicated to the inspection of aircraft or aircraft elements, for example in order to provide assistance during maintenance operations on an aircraft or on an aircraft element.

Verification of the condition of the external surface of an aircraft is typically performed by an operator whose field of view is limited.

In order to improve a procedure for inspecting a device it may be sought to want to help the operator performing this inspection by developing an augmented reality digital system wherein a real image is superimposed with one or more virtual elements in the form of one or more 3D objects embedded in a sequence of images and representative of elements of the device. Such 3D objects may therefore typically be established from models from CAD ("Computer-Aided Design") software and designed entirely by means of this software.

However, a 3D model of all of the parts of the device in question may not necessarily be available.

Moreover, certain 3D models from CAD tools may be confidential.

Finally, certain 3D models from CAD tools may be insufficient and/or not directly usable by a digital system for implementing and projecting augmented reality images.

DISCLOSURE OF THE INVENTION

One aim of the invention is to propose an improved method for creating at least one 3D digital model of at least one portion of a part or of at least one part or of at least one set of aircraft parts for producing augmented reality image(s).

According to one aspect, the invention relates to a method for creating a 3D digital model of at least one aircraft element in order to produce augmented reality image(s), the method comprising the steps of:
a) scanning, at least one element of an aircraft so as to produce a set of digitised points representative of the 3-dimensional shape of said element then, using a computer and/or at least one computer processing unit:
b) forming, from said set of digitised points, at least one given 3D mesh representative of the shape of said element,
c) modifying a replica of said given mesh so as to add at least one missing pattern to said replica and thus produce a 3D model of said aircraft element.

In this way, a 3D model is created that can be used for producing augmented reality images, without necessarily having access to or disposing of a corresponding model from, and created entirely by, CAD software.

Thus, particular areas of the scanned element may also be easily highlighted.

Another advantage of such a method is that it adapts to the modelling of a part portion, of a part or of a set of parts of the aircraft.

Such a method makes it possible to create 3D models for augmented reality rapidly, even when the scanned element or part has a complex shape.

The missing pattern may correspond to a pattern of said element located in its inner volume and/or which is located outside the field of view of the scanner during the scanning in step a).

Thus, a faithful 3D model of the aircraft element is created and thus the accuracy of the augmented reality images produced is improved.

Advantageously, adding said at least one missing pattern may be performed using computer-aided design (CAD) software and in particular a graphical interface having a drawing feature.

According to one possibility of implementation, the replica of said given mesh may be obtained using at least one step of reducing, carried out by said computer or said computer processing unit, a number of polygon cells constituting said given mesh while conserving an overall geometric shape of said given mesh. By reducing the 3D model in this way, it is possible for the system implementing the augmented reality to use fewer resources.

According to one possibility of implementation, the replica of said given mesh may be obtained by performing at least one correction step using said computer or said computer processing unit, by:
adding one or more polygon cells to said given mesh and/or,
removing one or more polygon cells from said given mesh, and/or
moving one or more polygon cells of said given mesh.

With such correction(s), it is possible to delete possible errors during digitisation and/or produce a more accurate model.

According to one aspect, the method may further comprise at least one step of cutting a first mesh corresponding to said given mesh or to a duplicate of said given mesh, the cutting being performed using said computer or said computer processing unit and comprising the sub-steps of:
defining a selection area including a plurality of polygon cells of the first mesh,
deleting the polygon cells located in said selection area so as to form a second mesh,
defining a third mesh resulting from the difference between the first mesh and the second mesh.

Advantageously, the replica of said mesh results in adjoining the third mesh to another mesh, this other mesh being obtained by cutting the first mesh according to a second selection area, said selection area and said second selection area respectively corresponding to portions of said element having similar shapes.

According to another aspect, the present invention relates to a method for producing augmented reality images of an aircraft element, comprising the steps of:
forming a 3D model of said aircraft element using a method such as previously defined,
displaying this 3D model in a sequence of augmented reality images.

According to another aspect, the present invention relates to a method for producing augmented reality images of an aircraft element, wherein the sequence of augmented reality images is formed using a 3D tracking tool using a parametric model translating movements and deformations of said given 3D mesh or of said replica.

According to another aspect, the present invention relates to a computer program comprising program code instructions to make it possible for the computer processing unit or the computer to execute one or more steps of a method such as defined above.

BRIEF DESCRIPTION OF THE DRAWINGS

The present invention will be better understood upon reading the description of examples of embodiment given, purely by means of indicative and non-limiting example, while referring to the appended drawings wherein.

Identical, similar or equivalent parts of the various figures bear the same numerical references so as to facilitate the transition from one figure to the other.

The various parts shown in the figures are not necessarily according to a uniform scale, in order to make the figures more readable.

DETAILED DISCLOSURE OF PARTICULAR EMBODIMENTS

Figure 1:
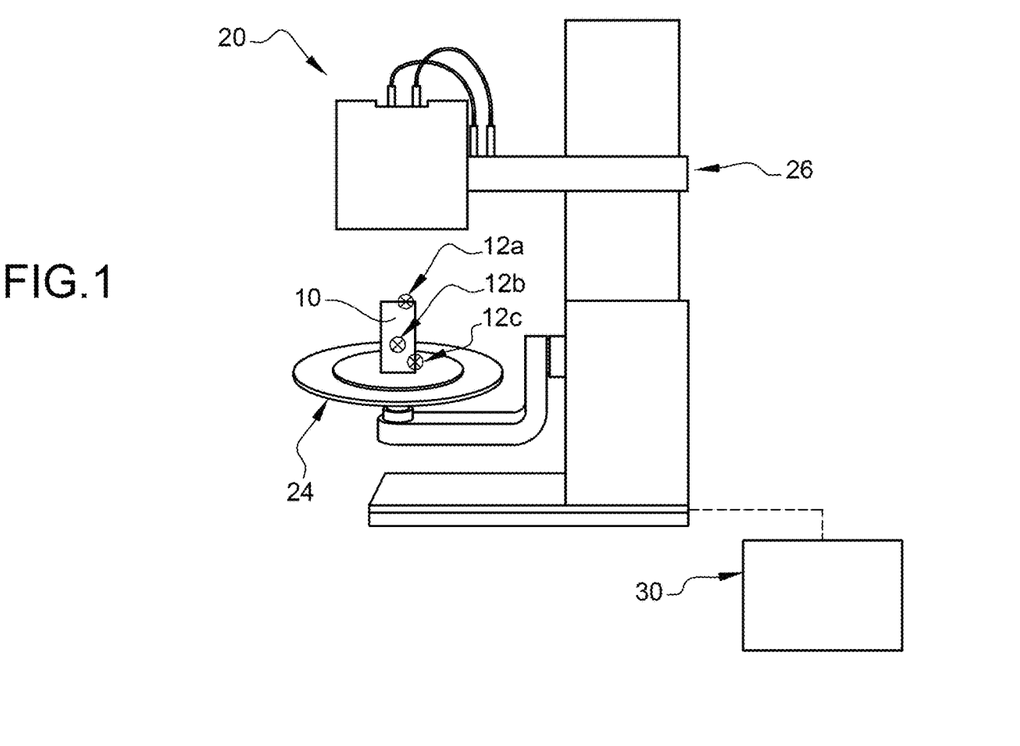
FIG. 1 illustrates a step of acquiring using a scanner, in this example of the contactless type, a point cloud of at least one aircraft element in view of constituting a 3D model of this element and of using this 3D model in an augmented reality image.

Reference is firstly made to FIG. 1 intended to illustrate a so-called step of "digitising" an aircraft part 10, and in particular a 3D model that can be used in augmented reality. For the sake of simplification, reference will be made in the present description to an aircraft part 10 but the processing operations described may apply more generally to an element corresponding to an aircraft part portion, to an aircraft part or to a set of aircraft parts in view of producing a 3D model of this part portion or of this part or of this set of parts. This 3D model is intended to be displayed in an image produced in augmented reality and may also be provided to be used in order to establish an object tracking model intended for the production of augmented reality images.

Digitisation comprises a step of scanning the part 10 using a three-dimensional scanner 20, typically an optical scanner emitting a light radiation, for example a blue light, in particular with narrow band, may be used to carry out such a digitisation of the shape of the part 10. According to a particular example, a scanner of the ATOS Core range manufactured by GOM, in particular an ATOS Core 5M MV300 scanner may be used.

This step contributes to creating a 3D model rapidly while eliminating a use of graphic objects saved and created entirely from CAD software.

The 3D scanner 20 particularly produces a set of digitised points of said element in a 3-dimensional space, these points being representative of the shape of the part 10. This set of points is obtained by projecting using at least one light radiation source a light pattern on the surface of the part 10.

The internal light source may be for example, formed of one or more lasers, for example of the vertical cavity surface emission type (VCSEL). The light source typically projects the light radiation stroboscopically or pulsed, at a particular frequency. One or more images of the structured light projected on the surface of the part 10 is or are acquired thanks to said at least one optical sensor for example in the form of one or more cameras and/or imagers. The set of digitised points is obtained from this or these image(s).

The three-dimensional scanner 20 here is connected to a data processing unit 30, typically a computer, particularly provided with at least one data processing processor and with one or more memories.

The scanner 20 may be disposed or fastened on a support 26, for example an articulated arm, moveable according to a plurality of degrees of freedom. In the example of embodiment illustrated, the aircraft part 10 to be scanned is itself arranged on a movable support 24.

Figure 2:
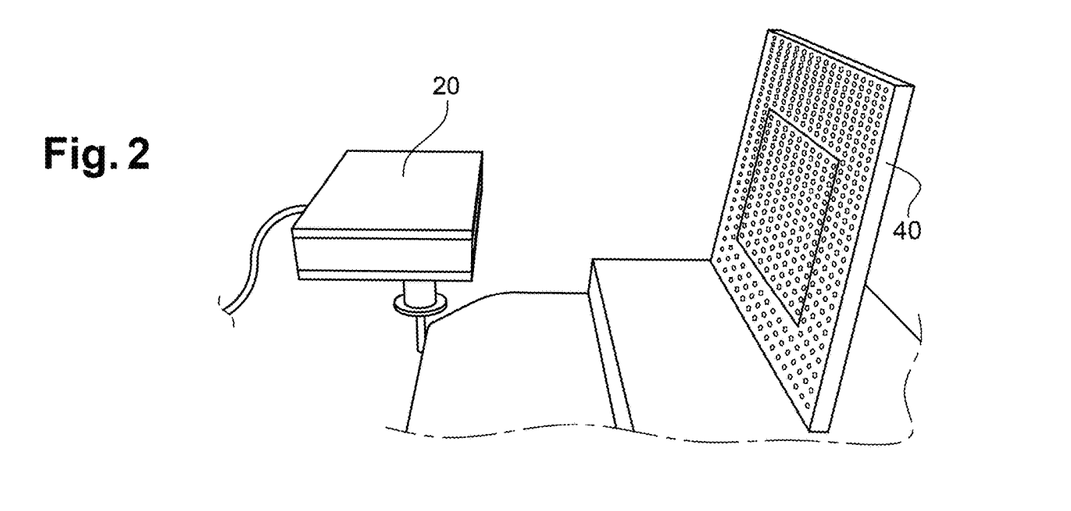
FIG. 2 illustrates a step of calibrating the scanner by means of a plate including a set of holes.

Optionally, a step of calibrating the scanner 20 beforehand may be carried out. In the example illustrated in FIG. 2, such a step is performed using a plate 40 with patterns having a known regular distribution. Typically, the plate 40 is perforated and the calibration patterns are holes.

A step of preparing the surface of the part 10 to be scanned may also be carried out in order to improve the quality of the digitisation. Such a step may consist for example in coating the surface of the part 10 with a coating absorbing light radiation, and/or making it possible to modify its colour. According to a particular example of embodiment, a coating based on MR® 2000 Anti-Reflex L may be used.

In order to make it possible to obtain a better positioning of the points obtained during the image acquisition, the part 10 may be provided on its surface with marks 12a, 12b, 12c for example in the form of stickers or self-adhesive dots affixed in three distinct and non-aligned points of the part 10.

Figure 3A:
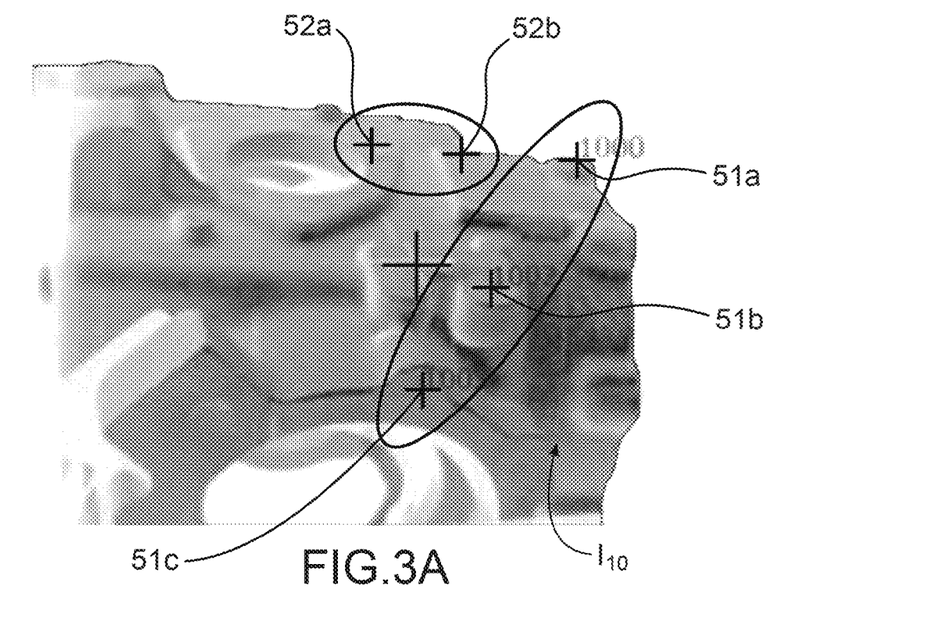
FIGS. 3A and 3B illustrate a point cloud obtained by digitising an aircraft element.
Figure 3B:
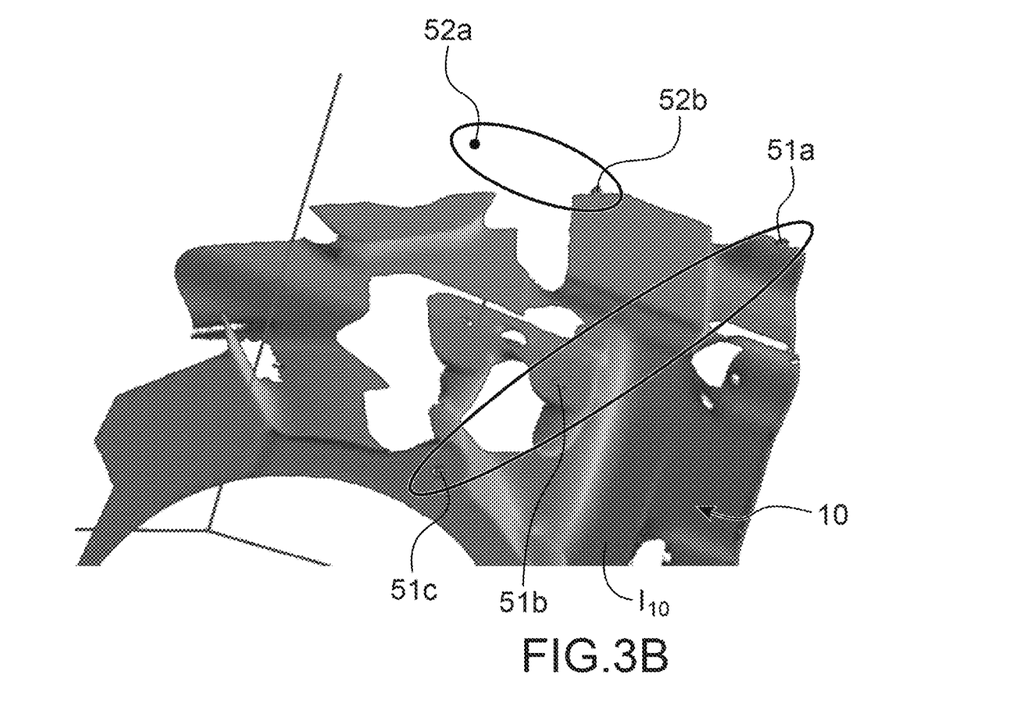

FIGS. 3A-3B intend to illustrate an image $I_{10}$ of a scanned aircraft part 10 with 3 reference points 51a, 51b, 51c corresponding to the respective positioning of the stickers or dots. This positioning on the part 10 is known and that of new points 52a, 52b, is deduced using these reference points

51a, 51b, 51c. The acquisition and the determination of coordinates of new points is subsequently carried out iteratively by resetting in relation to a scanned point cloud and the coordinates of which themselves were determined from points 51a, 51b, 51c, 52a, 52b.

An analysis of the scanned points may subsequently be performed by means of an application, more particularly of a first data processing software tool that may be installed for example in the computer 30 connected to the scanner or that can be used via this computer 30. The software tool in question makes it possible to carry out a visual and interactive exploration as well as a graphical representation of imported measurement data and a processing of these data. For example, such a tool may be the "ATOS Gom Scan" tool. The 3D point file obtained may subsequently be corrected by deleting certain possible errors or parasitic elements saved during the digitisation.

For example, when the scanned part 10 is disposed against a support such as a protective mat, parasitic points representative of this support are deleted. For this purpose, it is possible to define with the aforementioned tool a selection trap making it possible to select undesirable points, then, using a feature of this tool, remove these undesirable points.

A corrected 3D point file may subsequently be processed in order to form a mesh $M_{10}$. This mesh $M_{10}$ is typically formed of points and edges forming cells in the form of polygons typically triangles or quadrilaterals. The cells themselves constitute polyhedra, for example trihedra. Such a mesh $M_{10}$ differs from a parametric model obtained by a CAD tool and containing a set of functions and parameters defining volumes.

Such a mesh $M_{10}$ may be obtained particularly using a processing for example using a mesh algorithm particularly implementing an operation of the Delaunay triangulation type.

The mesh $M_{10}$ may be created using a second software tool. This second tool may make it possible to perform an analysis, a visual and interactive exploration, a graphical representation of imported measurement data and a processing of these data. Such a tool that can be used by means of the processing unit 30 or computer 30 and possibly stored in the latter may make it possible to perform in particular an analysis of shapes, dimensions, processing operations of 3D meshes. According to a particular example of embodiment, this second software tool may be the "GOM Inspect Suite" tool, in particular when the digitisation is performed using a GOM scanner. 3D rendering and modelling software of the "Blender" type or 3D model design software of the CATIA® type may also be used.

Figure 4:
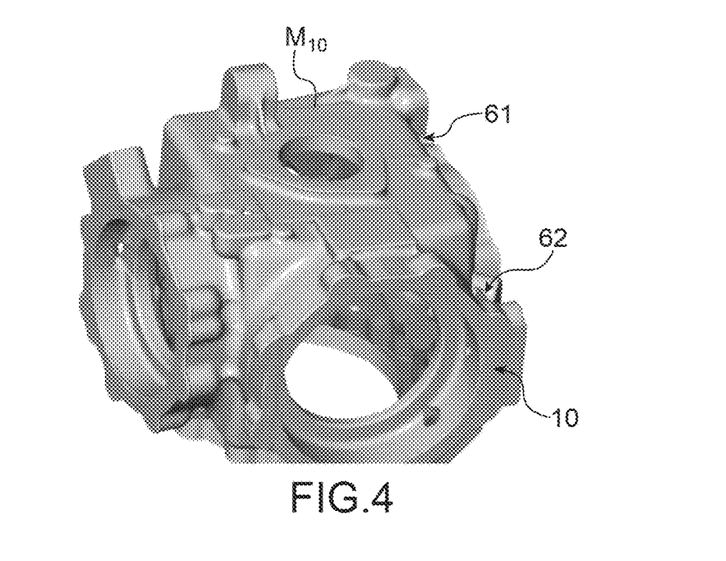
FIG. 4 illustrates a mesh of the part obtained from the aforementioned point cloud.

A graphical representation of the mesh $M_{10}$ of the scanned part obtained using a second tool is given for example in FIG. 4. In this figure, the meshes or cells constituting the mesh are not visible given their density.

In this particular example of embodiment, the second tool is configured to perform a counting of geometric elements figuring in the graphical representation of the part 10. Here, for example, a number of distinct holes of the mesh $M_{10}$ and of the cells constituting it, is created and may be compared with a number of holes actually figuring on the part 10 of which the digitisation was performed. Such a feature may make it possible to help to carry out a repair of the mesh $M_{10}$. Thus, holes 61, 62 corresponding to incomplete portions of the mesh $M_{10}$ may be identified.

The repair of the mesh $M_{10}$ may subsequently be carried out. Such a repair step may be performed using the aforementioned second tool and comprise a deletion of certain cells, for example aberrant cells resulting from an inaccurate positioning of one or more points during the digitisation step.

Figure 5:
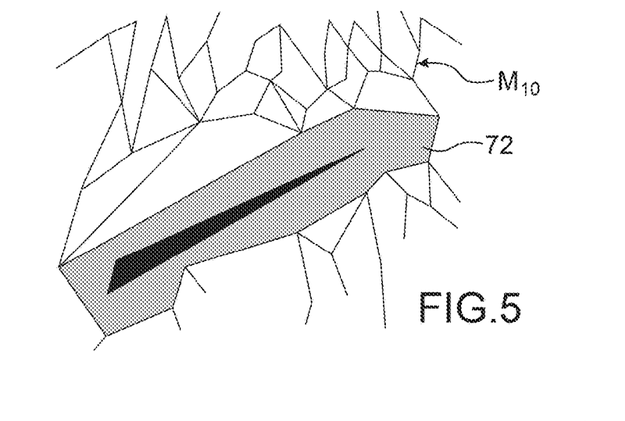
FIG. 5 illustrates a step of deleting a triangular cell of the aforementioned mesh.

In the example of embodiment illustrated in FIG. 5, where the mesh is formed of triangular cells, a step of deleting an aberrant triangle 71 located within a selection area 72 is implemented.

Figure 6:
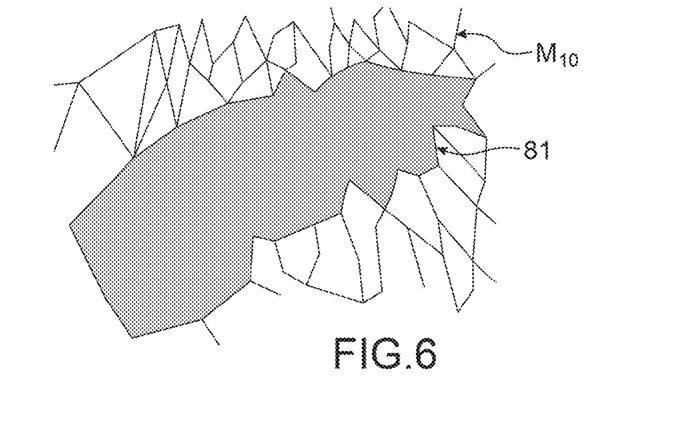
FIG. 6 illustrates a step of adding triangular cells on the aforementioned mesh.

An interpolation of hole(s), for modifying the contour of one or more holes or deleting one or more holes may also be performed, in particular using the aforementioned second tool. In the example illustrated in FIG. 6, a hole 81 that it is desired to delete is shown. In this case, this concerns performing an addition of cells to carry out the correction.

The repair of the mesh may also comprise, in particular using the aforementioned second tool, a step of joining surfaces together. For example, when the surfaces to be connected are wall portions around a drill hole, rather than delete this drill hole using an interpolation step such as previously mentioned, these distinct portions may be joined in a single surface.

Figure 7:
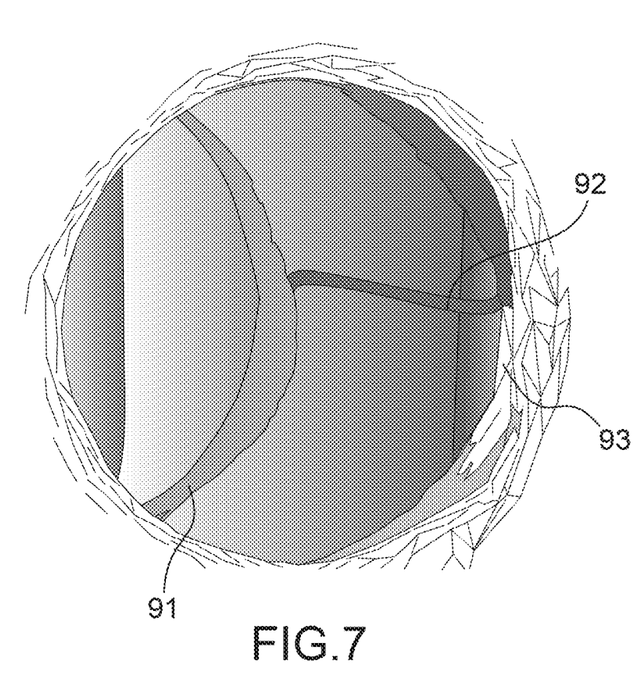
FIG. 7 illustrates a repair or correction of the mesh by implementing a sub-step of joining surfaces.

In the example illustrated in FIG. 7, such a joining of surfaces results in the formation of a bridging surface 92 connecting wall portions 91, 93 of a hole. Such an operation may be for example performed by selecting at least two cells to be connected, here in the form of two separate triangles and by using a bridging feature of the aforementioned tool. Such an operation may be repeated a plurality of times to create the bridging surface 92.

At this stage, it may be desired to reconstitute one or more new surface(s) useful for completing the mesh $M_{10}$ and in particular corresponding to areas located in the inner volume of the part 10 and which are not visible, that is to say located outside the field of view of the scanner, even when the latter is moved in relation to the part 10. Thus, such areas do not figure among the set of points or in the point cloud digitised by the scanner previously mentioned. It may also be sought to only partially reconstruct the geometry of the part and to only give preference to one or more so-called "useful" surfaces, for example corresponding to surfaces that, on an augmented reality image, are represented for example to facilitate a removal or to make it possible to emphasise particular areas. For example, it may be desired to highlight on a 3D model areas to be painted or to be hidden of the part 10 during a paint processing step carried out by an operator by making use of an augmented reality image stream.

Prior to such a reconstruction step, a simplification of the mesh may be carried out aiming to reduce the number of elements, in particular cells constituting it. In order to carry out such a processing, the mesh resulting from the repair sub-step(s) previously carried out may subsequently be exported to a third data processing tool. For example, 3D modelling or CAD software such as the CATIA® tool may be used to perform such a processing, the mesh in this case being able to be exported in the form of a file in .STL format. Alternatively, such a step may be carried out, with the aforementioned first and/or the second tool. For example, 3D rendering and modelling software of the "Blender" type developed by the Blender Foundation or "GOM Inspect Suite" may be used to perform this simplification.

Such a simplification where the number of cells, for example the number of triangles forming the mesh, is reduced while conserving the overall geometric shape of the mesh, is typically performed in order to reduce the size of the file(s). Such a reduction is all the more useful because the subsequent processing operations required for the real-time rendering and computing in order to be able to implement an augmented reality image are generally consequent. For example, it may be sought to reduce the number of cells, in particular of triangles creating the mesh, to a given limit number defined by a user of the tool, which may be for example several tens of thousands of cells, for example 50,000 triangles. This limit number is selected so as to conserve a faithfulness of shape of the mesh with the real part 10 and therefore depends on the complexity and on the size of this part 10. Such a step may be implemented by using a particular feature of the third software tool, called "decimate" with which the mesh is selected and the desired number of cells (triangles) is selected. Such a feature and/or such a simplification step may be implemented using a polygon simplification algorithm.

Figure 8A:
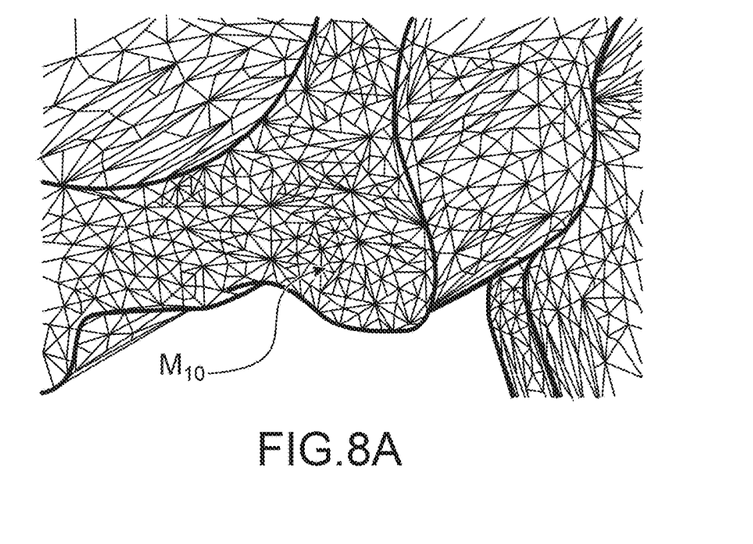
FIGS. 8A and 8B illustrate a step of simplifying the 3D mesh.
Figure 8B:
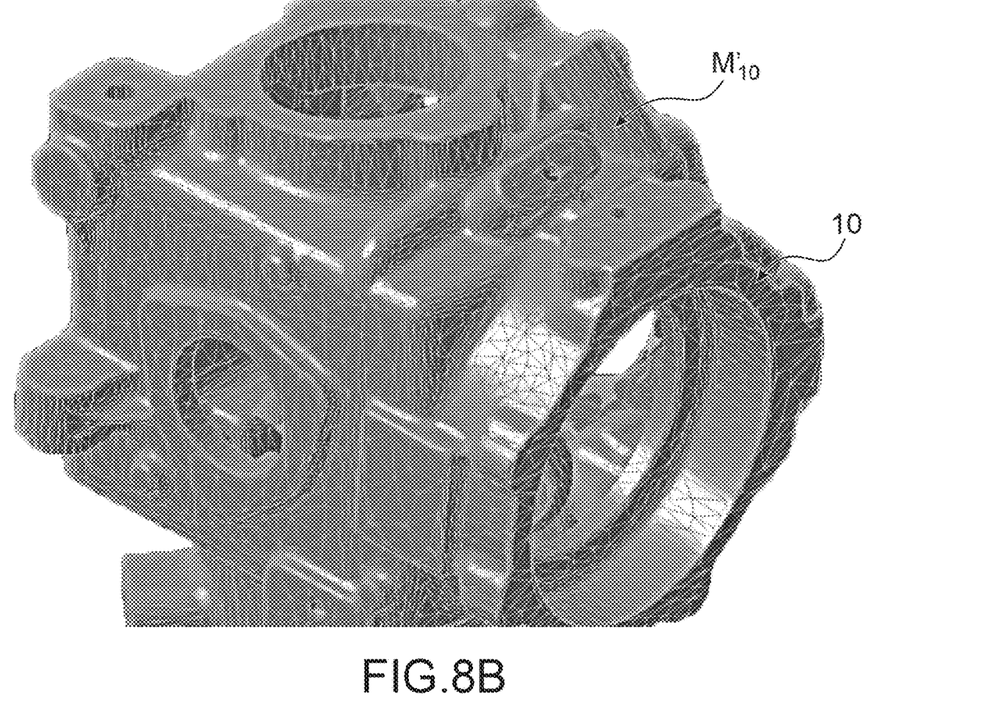

Such a simplification, here with a reduction of the number of triangles is illustrated in FIGS. 8A-8B respectively showing a mesh $M_{10}$ of a portion of the part 10 before polygon simplification and a new mesh $M'_{10}$ of the simplified part obtained at the end of a polygon simplification step.

The reduction performed and the level of simplification implemented may be adapted depending on the computing capacities of the computer means that are intended to be use as the medium for producing an augmented reality image stream and wherein a graphical representation of the part obtained from the mesh is intended to be inserted.

A division of the mesh $M_{10}$ or $M'_{10}$, also called "cutting", aiming to separate it into a plurality of portions may also be carried out.

Such a step may be performed for example in order to isolate and possibly to reconstruct a mesh portion corresponding to a particular surface of the scanned object 10, for example a bore, in the aim of being able to facilitate a possible subsequent processing or of being able to emphasise it by means of a particular display. The isolated portion may be duplicated and a copy may subsequently be processed as an independent mesh.

Such a processing and such a display may be performed for example by means of a module of the third software tool, for example the "Catia Composer" module.

Cutting is performed by firstly carrying out a selection of cells in particular triangles in the aim of separating the mesh into at least two distinct meshes.

During this step, it is possible to conserve the initial mesh and create two new meshes, each being one of the two portions, selected or not of the initial mesh. The initial mesh may be intended for the recognition or for the tracking of objects performed for implementing a sequence of augmented reality images.

A possible new cutting operation may then be performed on one of these meshes.

Figure 9:
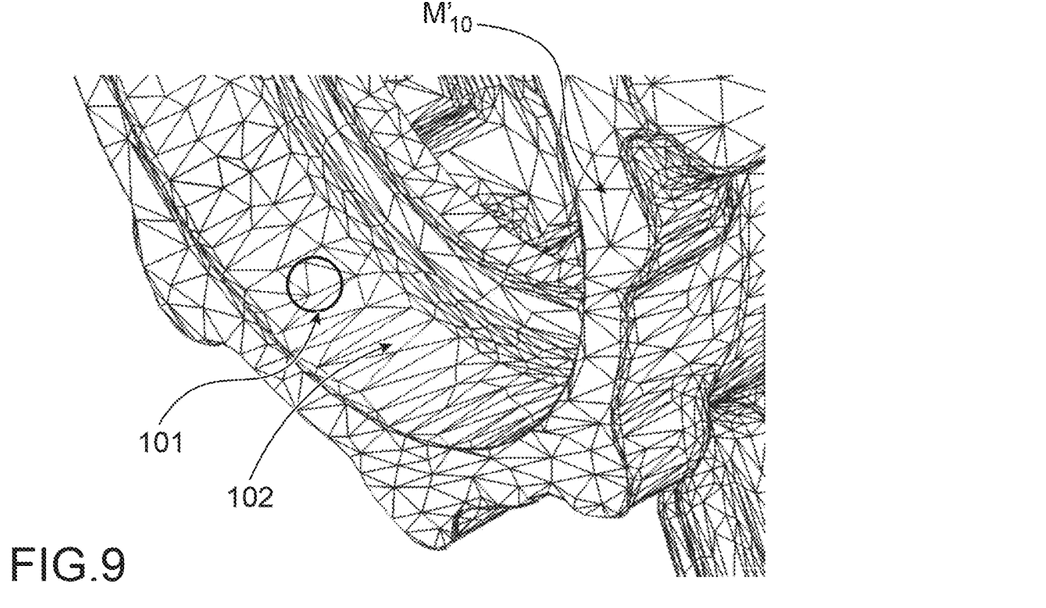
FIG. 9 illustrates a first mode for selecting cells of a surface of a 3D mesh in view of its cutting.

The selection and deletion of cells for carrying out this cutting may be performed as in the example of embodiment illustrated in FIG. 9, with a selection area 101, of dimension smaller than that of a surface 102 to be processed, and that is moved.

Figure 10:
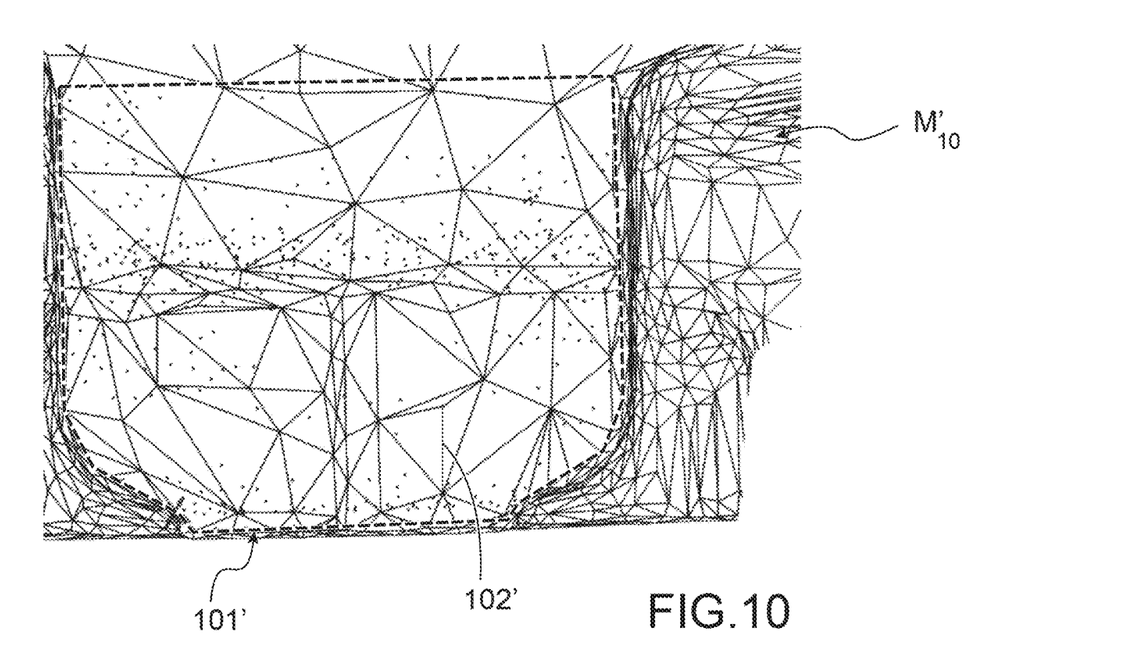
FIG. 10 illustrates a second mode for selecting cells of a surface of a 3D mesh in view of its cutting.

According to another example of embodiment illustrated in FIG. 10, this selection may also be performed with a selection area 101' called "trap" of dimension and shape corresponding to that of a surface 102' to be processed, in other words that it is desired to cut.

Figure 11:
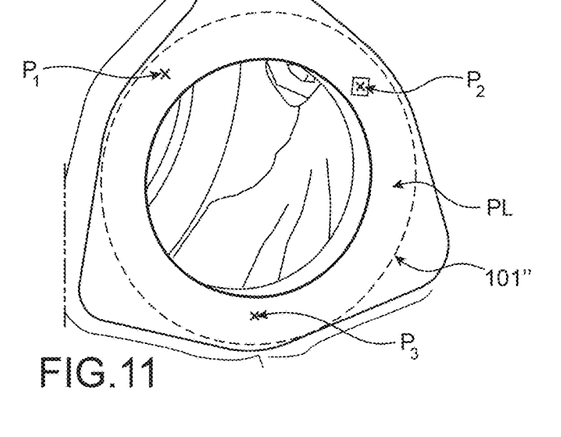
FIGS. 11, 12 and 13 are intended to illustrate a creation of a selection area of particular shape for performing a 3D mesh cutting.
Figure 12:
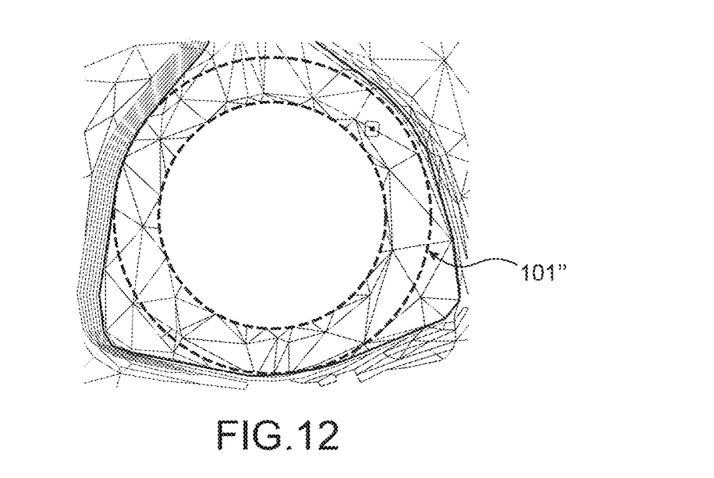

In the example of embodiment illustrated in FIGS. 11 and 12, in order to be able to more accurately locate the selection area 101" of the trap type or when the shape of the selection area is difficult to create manually by a user of the tool, this selection area may be created by firstly having a plurality of points preferably, at least three non-aligned points $P_1, P_2, P_3$, on a mesh portion to be selected.

Subsequently, a plane PL is defined from these three points $P_1, P_2, P_3$.

A feature such as that entitled "Part Design" of the aforementioned tool may subsequently make it possible to develop a selection area according to the desired geometry. In the example of embodiment illustrated in FIG. 12, the selection area 101" is in the shape of a ring.

Figure 13:
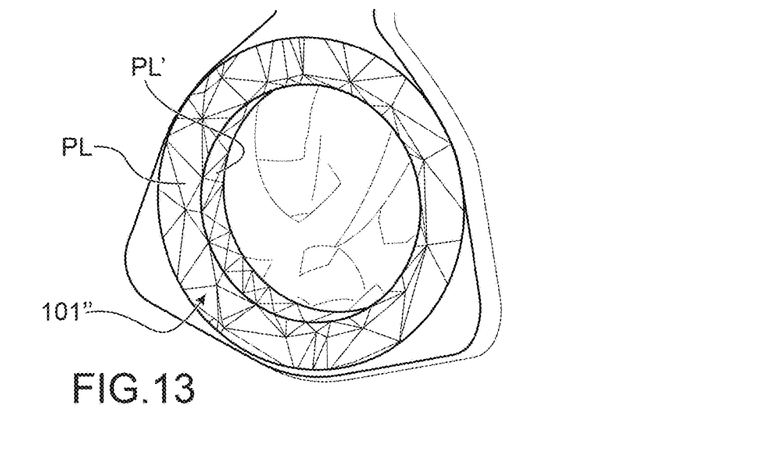

In FIG. 13, the selection area 101" corresponds this time to an area that is not planar and formed of distinct and non-parallel planes PL, PL'.

Selection area shapes other than those described and illustrated above may be implemented. In particular, it is possible to create selection areas with a contour creating curves.

It is also possible at this stage or from the simplified mesh $M'_{10}$ previously obtained to carry out again one or more corrections, and in particular perform a deletion of mesh element(s) such as at least one point, at least one edge, at least one cell for example in the shape of a triangle. Such a step may make it possible to possibly repair one or more error(s) on the original mesh or a possible error introduced during the cutting step mentioned previously.

It is also possible to carry out one or more corrections on the simplified mesh $M'_{10}$ or on one of those obtained after cutting this time by adding one or more mesh elements for example by carrying out an addition of cells, in particular of triangular cells.

Optionally, it is also possible to merge a plurality of distinct meshes. For example, at least one supplementary mesh is added or adjoined to a mesh representative of the part 10 or of the complete element 10, for example a mesh representative of a bore and/or of a chrome area or of a shoulder may be adjoined to a mesh representative of a part including this bore, this chrome area or this shoulder.

Another example of mesh merging may for example consist in joining all portions of a part having shape similarities. For example, a resulting mesh may be created wherein all of the holes of a part are shown. Other shape combinations such as for example bores, bevels, bosses, teeth, nicks, shoulders, recesses, slots, grooves, ribs, protrusions, may also be created.

The supplementary mesh(es) may have graphical representations different from those of the original mesh, for example different colours in order to emphasise them.

A so-called "reconstruction" step may subsequently be carried out. This step corresponds to adding to a mesh obtained by means of one or other of the processing steps described above one or more portions corresponding to portions of the scanned part which are not located in the field of view of the scanner during the digitisation step, and in particular inner geometric elements of the part 10.

This step may be carried out using the third software tool and in particular a CAD tool. For example, the CATIA® software and its module entitled "Part Design" may be used for designing 3D models. Other CAD tools such as "Solid-Works" or 3D modelling tools such as "Blender" or "3Ds Max", or even "Rhinoceros 3D" may also be used to create such a reconstruction.

The reconstruction may be created by using a drawing feature of one of the aforementioned tools in order to add one or more missing patterns.

Prior to such a reconstruction, a workbench may be defined in the CAD tool. Such a definition is created by selecting three distinct and non-aligned points on the mesh of the part 10 in a format that can be used by the CAD tool.

Figure 14A:
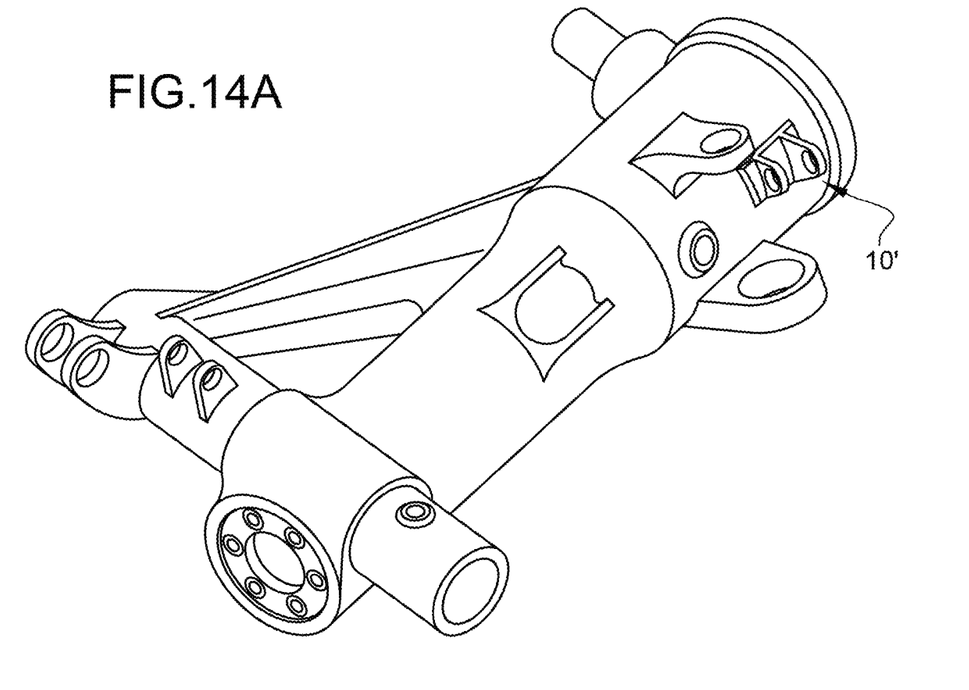
FIGS. 14A and 14B illustrate a reconstruction of the inner volume of a part model.
Figure 14B:
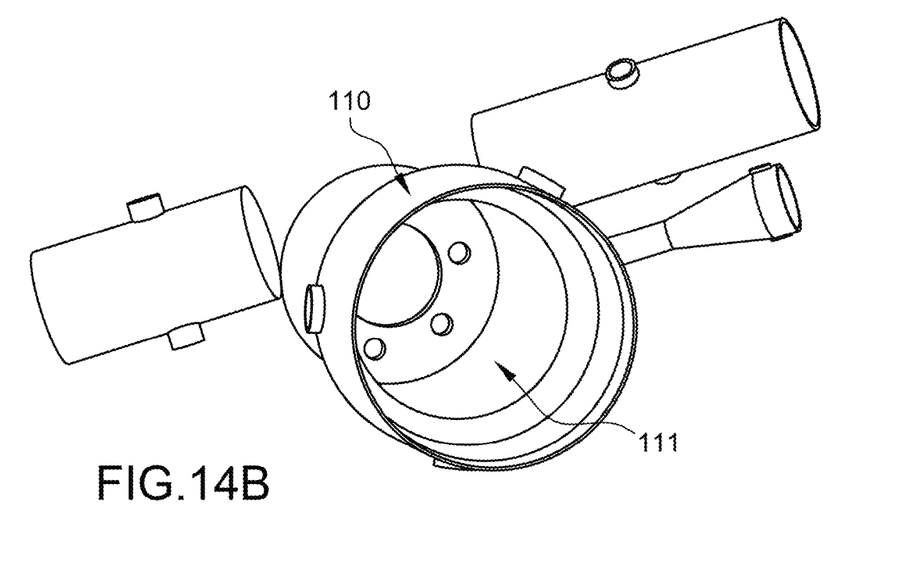

In some cases, as in the example of embodiment illustrated in FIGS. 14A-14B, (respectively giving an internal view and an external view of a part 110), the creation of a very accurate reconstruction may be optional and it may be desired to recreate a general look of the inner volume 111 of a part 110.

In one case, particularly, where a definition drawing is not available but that the geometry of the part is known, and in particular that a phase plan is available, a reconstruction may be created using projections of points of a mesh and formatting operations.

Figure 15:
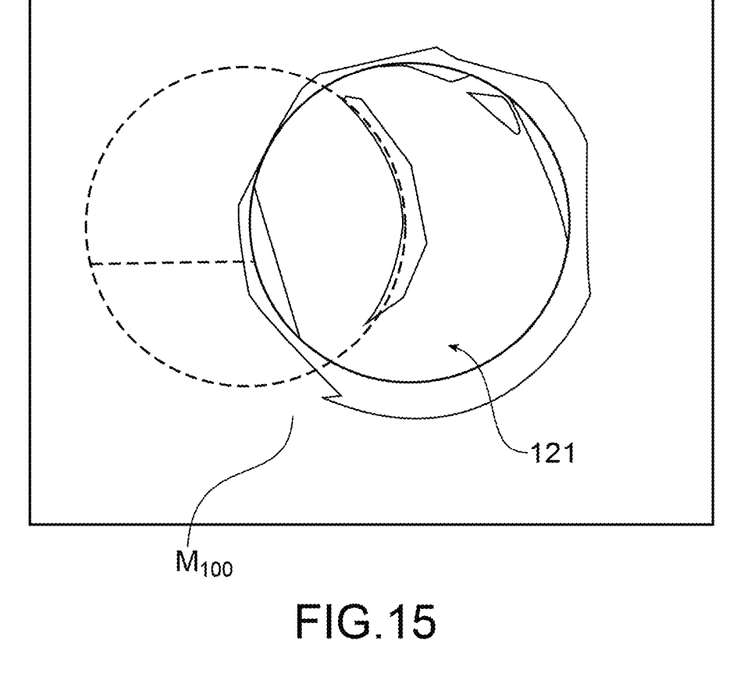
FIGS. 15 and 16 illustrate a step of reconstructing the inner volume of a part model.
Figure 16:
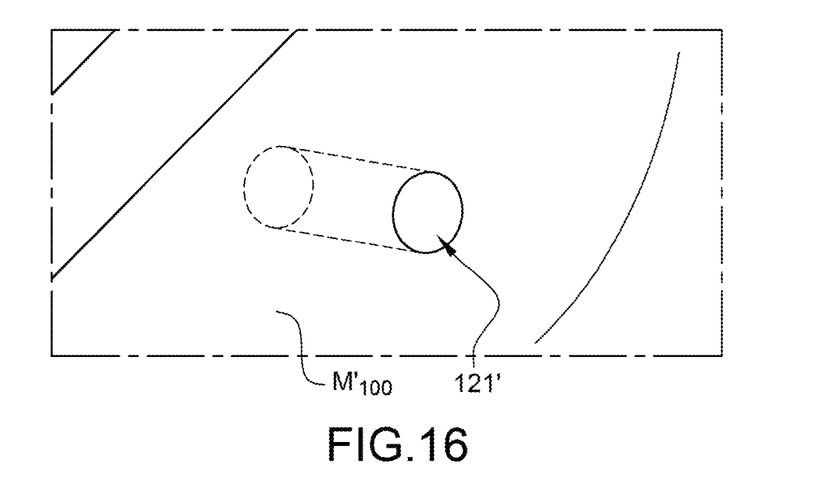

In the examples illustrated in FIGS. 15 and 16, a projection of an area 121, 121' of a mesh $M_{100}$, $M'_{100}$ obtained using processing operations such as described above is performed, in order to add a supplementary mesh portion to this mesh and to complete it.

Figure 17A:
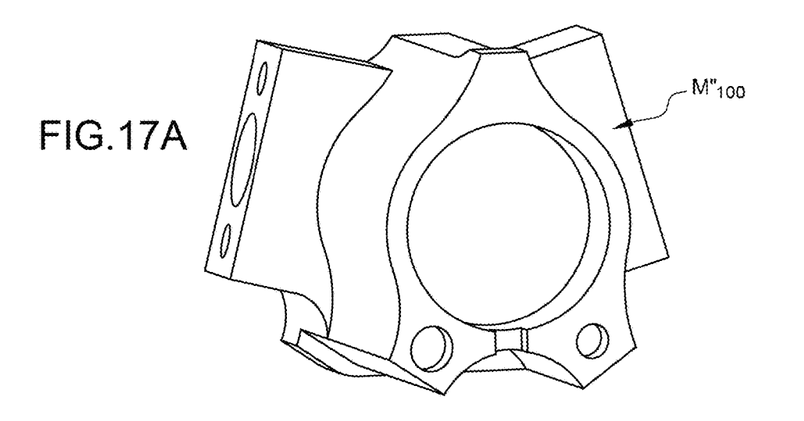
FIGS. 17A and 17B illustrate another step of reconstructing the inner volume of a part model.
Figure 17B:
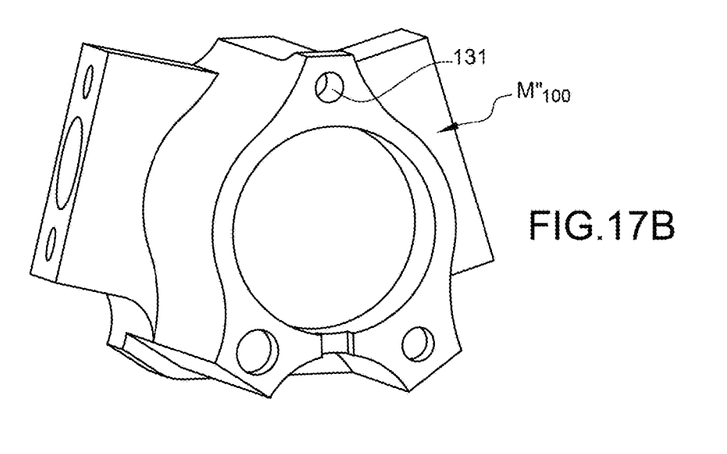

Another type of reconstruction illustrated in FIGS. 17A-17B consists in modifying a mesh $M''_{100}$ obtained at the end of steps such as described above by locally deleting therefrom certain cells and by adding thereto others, so as to create a hole 131 that extends in its inner volume. Indeed, it may transpire that at this stage the resulting mesh contains errors that it is desired to correct. For example, a drill hole in a scanned part could be completely resealed due to a digitisation error or an incorrect interpolation.

A 3D model produced from a mesh obtained using processing operations described above is required, when it is integrated into a virtual image, to move and/or have a shape, a dimension, a positioning that are likely to change depending on the positioning, and on the distance at which a user is located from a system projecting augmented reality images of the part 10.

In a sequence of augmented reality images in order to make it possible to correctly display the surfaces of the part 10 via a software platform for example such as "Diota Player", a solution consists in using copies of one or other of the meshes described above having undergone a shift step.

A mesh movement by translation of each of the polygons of the mesh and in a direction parallel to a normal at the surface of the polygons may be implemented. Such a shift type differs from a homothety insofar as here it is desired to preserve the internal diameters.

Such a movement may be performed for example using a "mesh shift" feature of the "Part Design" tool. With such a tool, a shift parameter is set, for example according to a shift pitch that may be between 0.2 and 0.5 mm. Here, preference is given to a shift of a mesh representative of the element 10 or of the complete part 10 rather than shifting meshes corresponding to single surfaces of the part 10.

According to an alternative embodiment, when the part or the element that it is desired to model has an element or a corresponding symmetrical part in the aircraft, it is possible to 3D scan only one of the two parts and carry out the aforementioned processing operations from the point cloud obtained during this digitisation. From this point cloud, a 3D model of the symmetrical part may be created, by using a feature for creating a symmetrical model of the tool(s) previously mentioned. In particular, a symmetry operation of the Catia "Part design" software tool may be used. Firstly, a plane of symmetry is formed, for example by defining 3 distinct points. Then, the part or an area of the part the symmetry of which is desired to be created is selected.

A 3D model 1 obtained at the end of the steps described above may subsequently be imported on an augmented reality image display tool. The tool in question may be for example "Diota Connect for Composer" from Diota. In this case, the 3D model created may be imported according to a CatPart type format.

Figure 18:
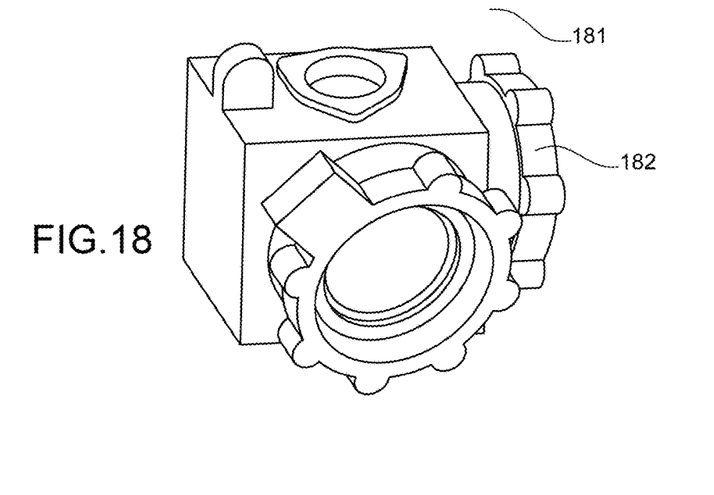
FIG. 18 illustrates a 3D model of an aircraft part inserted into an augmented reality image that was obtained by digitisation using a scanner then digital processing operations of at least one mesh from this digitisation.

In FIG. 18 an augmented reality image 181 gives a view of such a 3D model 182 of the object 10 obtained by digitisation then a succession of processing operations such as described above. The final result is close to a result that would be obtained by using a model designed entirely by CAD.

Figure 19A:
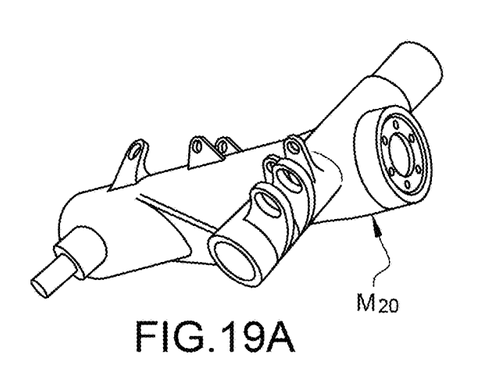
FIGS. 19A, 19B, 19C, 20A, 20B and 20C illustrate the transformation of a 3D model of an aircraft part obtained by digitisation using a scanner into a 3D model with inner geometry reconstructed in view of its use in augmented reality images.
Figure 19B:
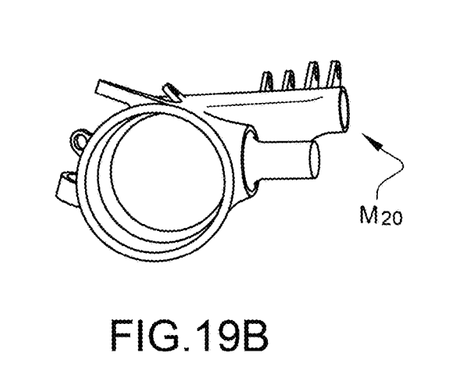
Figure 19C:
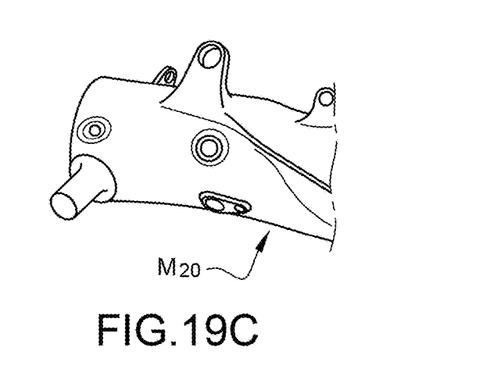
Figure 20A:
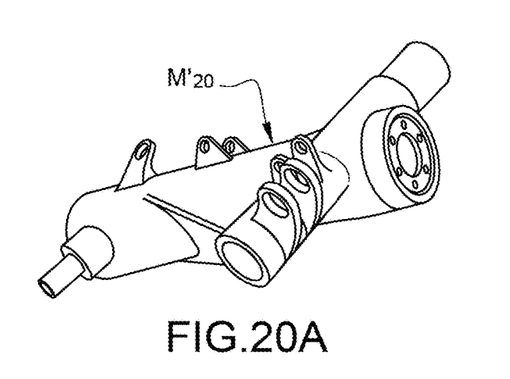
Figure 20B:
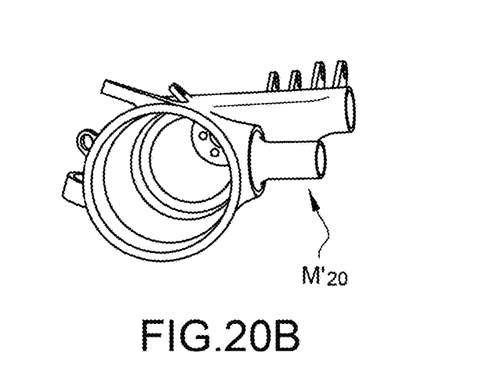
Figure 20C:
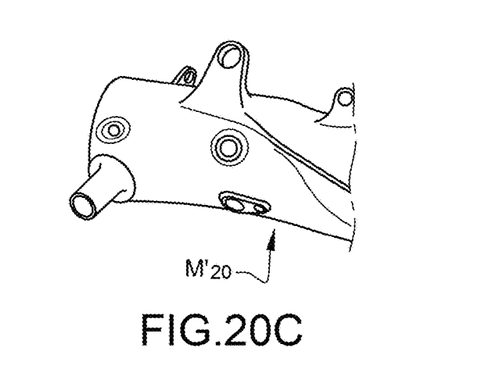

FIGS. 19A-19C respectively show a mesh $M_{20}$ obtained after digitising another aircraft part whereas FIGS. 20A-20C show a 3D model $M'_{20}$ of this part obtained after a step of reconstructing the inner volume of the part 20 created from the mesh $M_{20}$, here carried out using CAD software. Thus, one or more internal surfaces were recreated that a simple acquisition with the scanner alone does not make it possible to produce.

A virtual object superimposed with an augmented reality image flow may be produced using a hybrid 3D model formed of a geometric 3D model such as described above and of a parametric model. The superimposition is performed by means of an object tracking software tool also called object tracking engine and using object tracking algorithms. Such algorithms typically include steps of predicting the position of the object by knowing specific information about its position and its movement, of matching the object in an image area by using the parametric 3D model, particularly translating the movements, the deformations of the object and that is iteratively updated.

What is claimed is:

1. A method for creating a three-dimensional (3D) digital model of at least one aircraft element in order to produce augmented reality image(s), the method comprising the steps of:
   a) scanning, said at least one element of an aircraft so as to produce a set of digitised points representative of the 3D shape of said element, then, using a computer and/or at least one computer processing unit:
   b) forming, from said set of digitised points, at least one 3D mesh representative of the 3D shape of said element,
   c) modifying a replica of said at least one 3D mesh so as to add at least one missing pattern to said replica and produce the 3D digital model of said aircraft element,
   the method further comprises at least one step of cutting a first mesh corresponding to said at least one 3D mesh or to a duplicate of said at least one 3D mesh, the cutting being performed using said computer or said computer processing unit and comprising the sub-steps of:
   defining a selection area including a plurality of polygon cells of the first mesh,
   deleting the polygon cells located in said selection area so as to form a second mesh,
   defining a third mesh resulting from the difference between the first mesh and the second mesh.

2. The method according to claim 1, wherein the missing pattern corresponds to a pattern of said element located in its inner volume and/or which is located outside the field of view of the scanner during the scanning in step a).

3. The method according to claim 1, wherein said replica of said at least one 3D mesh is obtained using at least one step of reducing, carried out by said computer or said computer processing unit, a number of polygon cells constituting said at least one 3D mesh while conserving an overall geometric shape of said at least one 3D mesh.

4. The method according to claim 1, wherein the replica of said at least one 3D mesh is obtained by performing a correction step using said computer or said computer processing unit, by:

adding one or more polygon cells to said at least one 3D mesh and/or, removing one or more polygon cells from said at least one 3D mesh, and/or moving one or more polygon cells of said at least one 3D mesh.

5. The method according to claim 1, wherein the replica of said at least one 3D mesh results in adjoining the third mesh to another mesh, said another mesh being obtained by cutting the first mesh according to a second selection area, said selection area and said second selection area respectively corresponding to portions of said at least one aircraft element both having either a bore shape, or a bevel shape, or a boss shape, or a tooth shape, or a nick shape, or a shoulder shape, or a recess shape, or a slot shape, or a groove shape, or a rib shape, or a protrusion shape.

6. The method according to claim 1, wherein the replica of said mesh results in adjoining the third mesh to another mesh, said another mesh being obtained by cutting the first mesh according to a second selection area, said selection area and said second selection area corresponding to portions of said element and having a same geometrical shape.

7. A method for producing augmented reality images of an aircraft element, comprising:

forming the 3D model of said aircraft element using the method according to claim 1, displaying said 3D model in a sequence of augmented reality images.

8. The method for producing augmented reality images of an aircraft element according to claim 7, wherein the sequence of augmented reality images is formed using a 3D tracking tool using a parametric model translating movements and deformations of said at least one 3D mesh or of said replica.

* * * * *